United States Patent
Summo

[11] 3,981,759
[45] Sept. 21, 1976

[54] METHOD OF ASSEMBLING A STORAGE BATTERY USING VIBRATORY ENERGY

[75] Inventor: Arthur M. Summo, Danbury, Conn.

[73] Assignee: Branson Ultrasonics Corporation, New Canaan, Conn.

[22] Filed: Nov. 17, 1975

[21] Appl. No.: 632,240

[52] U.S. Cl............................. 156/73.5; 429/180; 429/185
[51] Int. Cl.².......................................... B29C 27/08
[58] Field of Search..................... 136/170, 168, 176; 156/73.1, 73.5, 73.6; 264/23, 68

[56] References Cited
UNITED STATES PATENTS

| | | | |
|---|---|---|---|
| 3,483,066 | 12/1969 | Harris et al. | 156/73.1 |
| 3,560,283 | 2/1971 | Gomis et al. | 136/170 |
| 3,860,468 | 1/1975 | Scherer | 156/73.5 |

*Primary Examiner*—Donald L. Walton
*Attorney, Agent, or Firm*—Ervin B. Steinberg; Philip J. Feig

[57] ABSTRACT

A storage battery comprising a thermoplastic cover having a hollow metallic terminal therein and a thermoplastic case having an upstanding metallic core member passing through the terminal is assembled using vibratory energy. The cover and the case undergo relative reciprocating translating motion while under the influence of a static force applied in a direction perpendicular to the plane of the mating surfaces between the cover and case. The terminal and core are dimensioned for providing a peripheral clearance around the core in the direction of the reciprocating motion at least equal to the peak-to-peak displacement of the vibratory motion. The gap existing between the core and the terminal when the battery is assembled is sealed.

6 Claims, 3 Drawing Figures

METHOD OF ASSEMBLING A STORAGE BATTERY USING VIBRATORY ENERGY

BRIEF SUMMARY OF THE INVENTION

The present invention concerns a method of assembling a storage battery using vibratory energy. Specifically, the method of forming the terminals of the storage battery is disclosed.

Storage batteries generally comprise a non-corrosive case, typically constructed of thermoplastic material, containing a plurality of metallic plates which when immersed in an electrolyte undergo chemical reaction to create a voltage potential between a pair of electrodes. An upstanding core member is coupled to a positive and a negative potential plate forming the pair of electrodes. A thermoplastic cover having a hollow metallic battery terminal associated with each core member is then attached to the thermoplastic case for sealing the battery. The terminal is subsequently sealed for providing a means whereby the electrodes are electrically connected to the terminals for coupling the voltage potential to an external load.

In prior storage battery assembling methods, the case has been attached to the cover by means of hot plate welding, hot flame welding, adhesive bonding and the like. The present invention describes a method of assembling a storage battery using vibratory energy which provides an improved bond exhibiting reduced flash, and produces a joint in a shorter time than has been attainable heretofore.

Generally, the cover and the case have mating surfaces which under the influence of friction soften and melt, when the frictional energy ceases the softened material at the mating surfaces solidifies to form a bond thereby providing a unitary body. The storage battery cover is constructed so that the hollow terminal is disposed around the periphery of the upstanding core member in the thermoplastic case.

The frictional heat in the present invention is generated by causing the battery cover and case to undergo relative reciprocating translating motion having, typically, a peak-to-peak displacement of approximately 170 mils (4 mm) while under the influence of a static clamping force. The peripheral clearance between the upstanding core member and the hollow terminal is dimensioned to be at least equal to the amount of relative displacement between the two thermoplastic battery parts.

After the cover and case are joined and form a unitary storage battery the battery terminal is sealed to the cover.

A principal object of the present invention, therefore, is the provision of an improved method of assembling a storage battery constructed of thermoplastic material by vibratory energy.

Another object of this invention is the provision of a method for assembling a thermoplastic cover having a hollow metallic terminal therein to a box-like thermoplastic case having an upstanding metallic member protruding therefrom by vibratory energy.

A further object of this invention is the provision of a method of forming a storage battery terminal dimensioned for permitting assembly of the battery by vibratory energy.

Further and still other objects of this invention will become more clearly apparent from the following description when read in conjunction with the accompanying drawings.

DETAILED DESCRIPTION OF THE INVENTION

Figure 1:
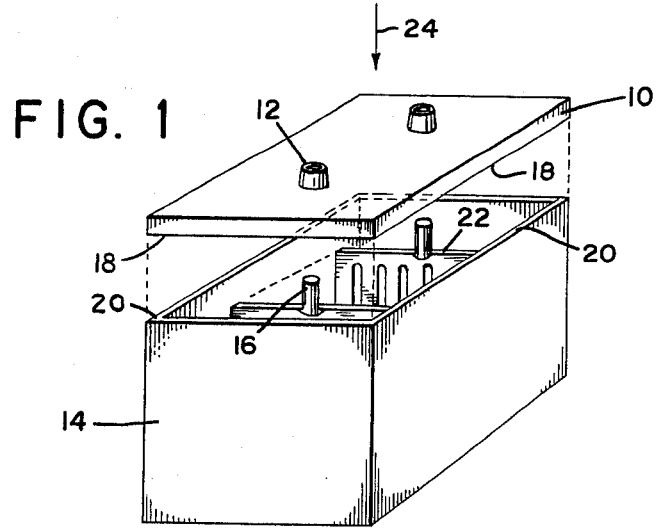
FIG. 1 is a perspective view of the storage battery portions to be joined.

Referring now to the figures and FIG. 1 in particular, there is shown battery cover 10, constructed of thermoplastic material, having a pair of spaced hollow metallic terminals 12 disposed therein. The cover is to be assembled by vibratory energy to a rectangular box-like case 14, also constructed of thermoplastic material, having a corresponding pair of upstanding cylindrical metallic core members 16 protruding therefrom. A preferred apparatus for joining the cover to the case utilizes linear frictional motion such as is disclosed in U.S. Pat. No. 3,920,504, issued to A. Shoh et al., entitled "Friction Welding Apparatus", dated Nov. 18, 1975. The battery case and cover are constructed to have respective mating surfaces 18 and 20 which under the influence of frictional energy soften. When the frictional energy ceases, the softened material along the mating surfaces 18 and 20 fuses together and rigidifies to provide a joint along the mating surfaces.

Figure 2:
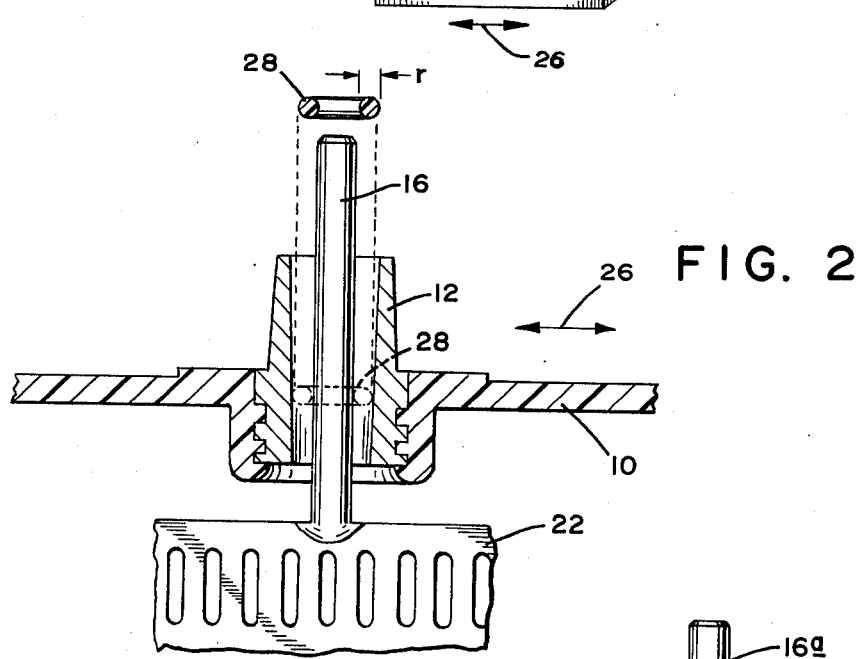
FIG. 2 is a sectional view of the storage battery terminal.
Figure 3:
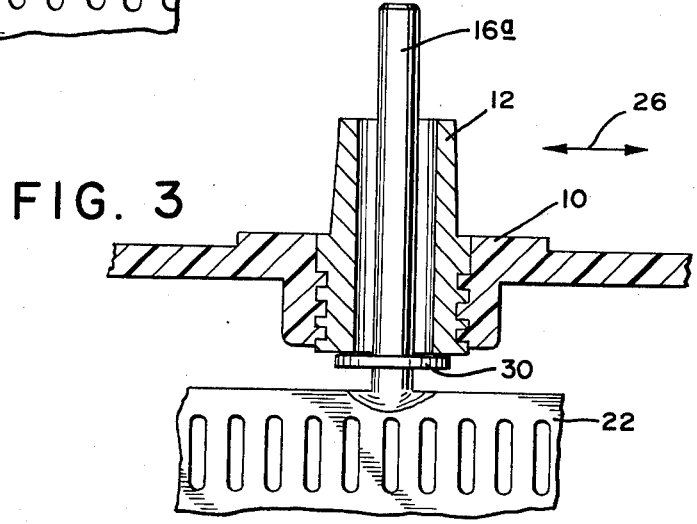
FIG. 3 is another sectional view of the storage battery terminal.

The battery portions initially are assembled by placing the cover 10 upon the case 14 in a manner to cause the upstanding core member 16 to be concentrically disposed within the hollow terminal 12 as shown in FIGS. 2 and 3. The battery case 14 contains a plurality of electrode plates 22 a pair of which have upstanding core members 16 for forming the battery terminals. A static clamping force is applied between the cover 10 and the case 14 in the direction of arrow 24 (FIG. 1), that is, in a direction normal to the plane of the juxtaposed mating surfaces 18 and 20. The cover and case are then caused to undergo relative reciprocating translating motion in the direction of arrow 26, parallel to the plane of the abutting mating surfaces 18 and 20, by means of a vibratory welding apparatus such as the type disclosed in Shoh et al., supra. As described above, the mating surfaces soften under the influence of the frictional energy and solidify when the relative motion ceases.

The relative motion typically is 170 mils (4 mm) peak-to-peak displacement. Therefore, the total peripheral clearance between the upstanding core member 16 and the hollow terminal 12 in the direction of arrow 26 must be equal to or greater than 170 mils (4 mm).

After the cover 10 is assembled to the case 14, the terminals must be formed. A preferred method of sealing the terminal, shown in FIG. 2, comprises press fitting a spacer such as a toroidal shaped plastic barrier ring 28, over the core 14 to the bottom of the terminal 12. The ring 28 is dimensioned to completely fill the peripheral clearance around the core member 16 at the bottom of the terminal 12. That is, the radius $r$ is equal to one-half the peak-to-peak displacement of the workpieces, 85 mils. Subsequently, the end of the core 16 is melted to flow into the gap between the core 16 and terminal 12 above the ring 28. Alternatively, molten metal, such as lead, is poured into the annular region above the ring 28. By employing either method a sound electrical contact as well as sealing of the battery is established between the core member 16 connected to a plate 22 and the terminal 12.

An alternative method of sealing the annular gap between the core member 16 and terminal 12 is shown in FIG. 3 wherein a retaining flange 30 has been provided in the upstanding core member 16a. The flange 30 is disposed for providing a maximum gap of approximately 15 mils (0.4 mm) between the top surface of the flange and the bottom surface of the terminal 12. As described hereinabove, the annular gap surrounding the core member 16 is filled with molten lead for making an electrical connection between the core member 16a and the terminal 12.

It will be apparent that while in the foregoing description a battery having a cylindrical core member and cylindrical terminal is described and illustrated, that in a further embodiment a core member and terminal of any geometric shape can be used. The storage battery is assembled by vibratory energy when the clearance between both outer edges of the core member and the inner edges of the hollow terminal in the direction of the reciprocating motion is at least equal to one-half the peak-to-peak displacement of the relative motion between the battery cover and case during the welding operation. The clearance between the core member and terminal in a direction perpendicular to the translating motion in the plane of the mating surface must be of sufficient dimension for precluding physical interference between the core and terminal during the vibratory welding process.

While a preferred method of assembling a storage battery by vibratory motion has been described, it will be apparent to those skilled in the art that further variations and modifications can be made without deviating from the broad principle of the present invention which shall be limited solely by the scope of the appended claims.

What is claimed is:

1. A method of assembling a storage battery by frictional energy comprising the steps of:

disposing a thermoplastic cover of the battery having a hollow metallic terminal therein upon mating surfaces of a thermoplastic case having an associated upstanding metallic core member passing through said terminal, the clearance between said terminal and said upstanding core member in the direction of motional displacement being at least equal to the motional displacement between said cover and said case when frictional energy is applied;

applying a static force between said cover and said case in a direction substantially perpendicular to the plane of the mating surfaces between said cover and said case while causing said cover and said case to undergo relative reciprocating translating motion in a direction substantially parallel to the plane of the mating surfaces for causing softened thermoplastic material at the mating surfaces;

stopping the translating motion while maintaining said static force for causing the softened material to rigidify whereby to provide a fused joint between said cover and said case, and sealing the gap between said terminal and said core.

2. The method as set forth in claim 1, sealing said gap between said terminal and said core by press fitting a spacer over said core and melting the core in the gap above said spacer.

3. The method as set forth in claim 1, sealing said gap between said terminal and said core by press fitting a spacer over said core and pouring molten metal into said gap above said core.

4. The method as set forth in claim 3, said molten metal being lead.

5. The method as set forth in claim 1, sealing said gap between said terminal and said core by forming in said core a flange and pouring molten metal into said gap.

6. The method as set forth in claim 5, said molten metal being lead.

* * * * *